(12) United States Patent
Rowe (10) Patent No.: US 7,133,899 B2
(45) Date of Patent: Nov. 7, 2006

(54) METHOD AND APPARATUS FOR PROVIDING INTERACTIVE TEXT MESSAGES DURING A VOICE CALL

(75) Inventor: Lorin Bruce Rowe, Belevue, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 872 days.

(21) Appl. No.: 09/917,821

(22) Filed: Jul. 31, 2001

(65) Prior Publication Data

US 2003/0028601 A1 Feb. 6, 2003

(51) Int. Cl.
| | |
|---|---|
| G06F 15/16 | (2006.01) |
| H04M 1/725 | (2006.01) |
| H04M 3/42 | (2006.01) |
| H04M 1/64 | (2006.01) |
| H04L 29/08 | (2006.01) |
| H04J 3/24 | (2006.01) |
| H04J 1/00 | (2006.01) |
| H04M 1/663 | (2006.01) |
| H04M 11/00 | (2006.01) |
| H04Q 7/22 | (2006.01) |
| H04Q 7/38 | (2006.01) |
| H04Q 7/20 | (2006.01) |
| H04H 1/04 | (2006.01) |
| H04J 1/02 | (2006.01) |

(52) U.S. Cl. ............ 709/206; 709/218; 709/231; 709/249; 455/412.2; 455/415; 455/466; 379/88.11; 379/88.13; 379/93.09; 370/473; 370/487; 370/493; 370/494; 370/495

(58) Field of Classification Search .......... 709/206, 709/207, 218, 227–229, 231, 249; 379/52, 379/88.11, 88.13, 88.16, 88.17, 93.09; 370/473, 370/487, 493–495; 455/412.1, 412.2, 414.4, 455/415, 458, 466

See application file for complete search history.

(56) References Cited

U.S. PATENT DOCUMENTS

| 4,554,418 | A | * | 11/1985 | Toy | 379/88.01 |
| 4,852,170 | A | * | 7/1989 | Bordeaux | 704/277 |
| 5,479,487 | A | | 12/1995 | Hammond | |
| 5,497,413 | A | * | 3/1996 | Nakano | 379/88.2 |
| 5,724,412 | A | * | 3/1998 | Srinivasan | 379/93.23 |

(Continued)

Primary Examiner—Jason Cardone
Assistant Examiner—Melvin H. Pollack
(74) Attorney, Agent, or Firm—Kenyon & Kenyon LLP (57) ABSTRACT

Embodiments of the present information relate to a method and apparatus for providing interactive text messages to a user's device during a voice call. In one embodiment, information is received from a client and at least a portion of the received information is converted into a text format. Non-converted information is transmitted to the user's device on a voice portion of a communications channel and the converted information is transmitted to the user's device on a data control portion of the communications channel. Accordingly, interactive text messages are presented to a user's device during a voice call.

49 Claims, 6 Drawing Sheets

U.S. PATENT DOCUMENTS

| | | | |
|---|---|---|---|
| 5,751,707 A | 5/1998 | Voit et al. | |
| 5,781,886 A * | 7/1998 | Tsujiuchi | 704/275 |
| 5,809,112 A * | 9/1998 | Ryan | 379/52 |
| 5,867,562 A | 2/1999 | Scherer | |
| 5,898,431 A * | 4/1999 | Webster et al. | 715/841 |
| 5,912,952 A * | 6/1999 | Brendzel | 379/93.25 |
| 5,937,040 A | 8/1999 | Wrede et al. | |
| 6,047,054 A | 4/2000 | Bayless et al. | |
| 6,163,536 A * | 12/2000 | Dunn et al. | 370/352 |
| 6,216,173 B1 * | 4/2001 | Jones et al. | 715/705 |
| 6,249,808 B1 * | 6/2001 | Seshadri | 709/206 |
| 6,269,336 B1 * | 7/2001 | Ladd et al. | 704/270 |
| 6,301,245 B1 * | 10/2001 | Luzeski et al. | 370/352 |
| 6,327,343 B1 * | 12/2001 | Epstein et al. | 379/88.01 |
| 6,334,126 B1 * | 12/2001 | Nagatomo et al. | 707/4 |
| 6,697,858 B1 * | 2/2004 | Ezerzer et al. | 709/224 |
| 6,714,536 B1 * | 3/2004 | Dowling | 370/356 |
| 6,717,938 B1 * | 4/2004 | D'Angelo | 370/352 |
| 6,738,803 B1 * | 5/2004 | Dodrill et al. | 709/218 |
| 6,757,732 B1 * | 6/2004 | Sollee et al. | 709/227 |
| 6,760,759 B1 * | 7/2004 | Chan | 709/219 |
| 6,772,188 B1 * | 8/2004 | Cloutier | 709/224 |
| 6,788,769 B1 * | 9/2004 | Waites | 379/93.24 |
| 6,792,082 B1 * | 9/2004 | Levine | 379/67.1 |
| 6,807,254 B1 * | 10/2004 | Guedalia et al. | 379/88.1 |
| 6,839,744 B1 * | 1/2005 | Kloba et al. | 709/219 |
| 6,850,603 B1 * | 2/2005 | Eberle et al. | 379/88.16 |
| 6,907,112 B1 * | 6/2005 | Guedalia et al. | 379/88.17 |
| 6,910,081 B1 * | 6/2005 | Hammond | 709/245 |
| 2001/0032234 A1 * | 10/2001 | Summers et al. | 709/201 |
| 2002/0075305 A1 * | 6/2002 | Beaton et al. | 345/751 |
| 2002/0161862 A1 * | 10/2002 | Horvitz | 709/220 |

* cited by examiner

METHOD AND APPARATUS FOR PROVIDING INTERACTIVE TEXT MESSAGES DURING A VOICE CALL

TECHNICAL FIELD

The present invention relates to communication services. More specifically, this invention relates to a system for providing interactive text messages during a voice call.

BACKGROUND OF THE INVENTION

Many businesses use automated attendants and/or automated voice response units (VRUs) that direct customers to a desired service and/or person. In a typical case, the customer is presented with a plurality of electronically generated prompts. The customer may be presented with a hierarchical menu structure that includes a plurality of verbal choices. The customer selects the desired choice by sending either a DTMF signal that results from pressing one of the touch tone pad buttons, or by verbal inputs. Through the interactive responses from the customer, the customer is eventually connected to the desired service or person.

Although such automatic systems can reduce costs, these conventional systems can be disadvantageous in that customers may not hear, remember and/or comprehend all the choices that are being verbally presented to them. In many cases, the customers may end up getting lost in the various menus and sub-menus presented by these automated systems. In other cases, the customer may need to "back up" but are unable to due to limitations of the system. Additionally, waiting for all the choices as they are being verbally presented can be time consuming and many cause many customers to seek a less burdensome alternative for the desired product or service. This can lead to "missed opportunities" for businesses that utilize conventional automated attendants and/or conventional VRUs.

SUMMARY OF THE INVENTION

Embodiments of the present information relate to a method and apparatus for providing interactive text messages to a user's device during a voice call. In one embodiment, information is received from a client and at least a portion of the received information is converted into a text format. Non-converted information is transmitted to the user's device on a voice portion of a communications channel and the converted information is transmitted to the user's device on a data control portion of the communications channel. Accordingly, interactive text messages are presented to a user's device during a voice call.

BRIEF DESCRIPTION OF THE DRAWINGS

Embodiments of the present invention are illustrated by way of example, and not limitation, in the accompanying figures in which like references denote similar elements, and in which.

DETAILED DESCRIPTION

Figure 1:
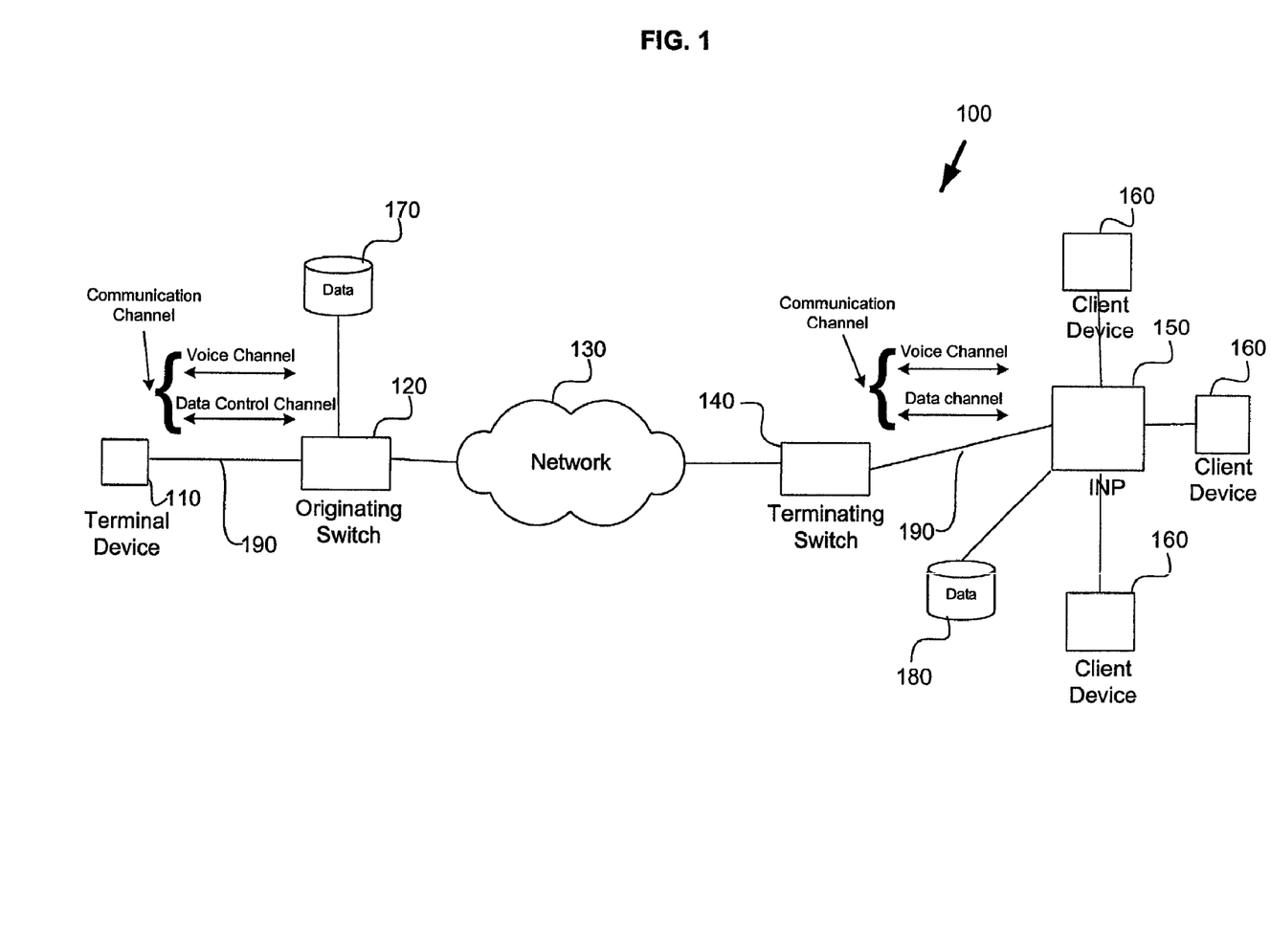
FIG. 1 is a block diagram of a system 100 in accordance with an embodiment of the present invention.

FIG. 1 illustrates a system 100 according to an embodiment of the present invention. Terminal device 110 can communicate with originating switch 120 that is connected to transit network 130. Intelligent Network Processor (INP) 150 is connected to terminating switch 140 that is also connected to transit network 130. Database 170 is connected to originating switch 120. INP 150 may be an intelligent private branch exchange (PBX) for processing data and instructions in accordance with embodiments of the present invention. INP 150 is connected to a plurality of client terminal devices 160. These terminal devices may include, for example, a telephone, a Voice Response Unit (VRU), an Interactive Voice Response Unit (IVRU), a paging unit, a personal computer, a intelligent device, an intelligent switch, a PBX, or any other suitable terminal device. The INP 150 may be coupled to a database or memory 180 that may include INP specific information that can be used to process call in accordance with embodiments of the present invention. In embodiments of the present invention, the memory 180 may be located external to or internal to INP 150.

Terminal device 110 can be any of a variety of device types such as a wired or wireless telephone, a one way or two-way pager, a Personal Digital Assistant (PDA), a personal computer, or any other suitable device. Terminal device 110 (also referred to herein as user device 110) communicates with INP 150 through originating switch 120, transit network 130, and terminating switch 140. The term "information" as used herein is intended to include data, text, voice, audio, video and/or multimedia information.

Originating switch 120 and terminating switch 140 are switching centers that receive and deliver calls. In the example illustrated in FIG. 1, originating switch 120 receives a call from terminal device 110; terminating switch 140 delivers that call to INP 150. Originating switch 120 and terminating switch 140 each has a processor, computer readable memory, a data port, a network port and a data bus. The data port permits communication with devices such as user device 110 or INP 140. The network port can be connected to transit network 130. The data bus connects the processor, the computer readable memory, the data port and the network port and permits communication between the various components of the switch.

Originating switch 120 and terminating switch 140 may operate special software to perform functions associated with toll calls and/or local calls. Originating switch 120 and/or terminating switch 140 can contain a dual tone modulated frequency (DTMF) detection unit to receive the DTMF signals. Alternatively, originating switch 120 and/or terminating switch 140 can contain a voice recognition unit to recognize voice responses. The 4ESS® switch manufactured by AT&T Corporation of New York, N.Y. and the 5ESS® switch manufactured by Lucent Technologies, Inc. of Murray Hill, N.J. are examples of the hardware that can perform the functions of originating switch 120 and terminating switch 140.

In embodiments of the present invention, originating switch 120 may be a Mobile Telephone Switching Office (MTSO) switch to handle calls from mobile telephones. As used herein, MTSO switch refers generally to any type of switch that can handle analog cellular, digital or PCS calls.

Note that while FIG. 1 merely shows one switch between a terminal device and transit network 130, additional switches can be present as well. In other words, although transit network 130 only shows originating switching 120 and terminating switch 140 connected, any number of additional switches in fact may be connected to transit network 130.

Transit network 120 may include, for example, a public switched telephone network (PSTN), an Integrated Services Digital Network (ISDN), a cellular network, a digital mobile network, a Personal Communication Systems (PCS) network, an Internet, an intranet, a signaling system 7 (SS7) network, a local area network (LAN), a satellite network, an advance intelligent network (AIN), any suitable digital or analog network, any other suitable national and/or international communications network or any suitable combination thereof.

For example, in the case where originating switch is an MTSO, transit network 130 can be a SS7 network. Alternatively, in the case where originating switch 120 and terminating switch 140 are central offices of local exchange carriers (LECs), transit network 130 can be the AT&T interexchange carrier (IXC) network. Alternatively, in the case where originating switch 120 and terminating switch 140 are IXC switches, switches 120 and 140 in addition to transit network 130 can comprise the AT&T IXC network; although not shown, central office switches can connect switches 120 and 140 to terminal devices 110 and 150, respectively.

Although FIG. 1 only shows terminal device 110 connected to originating switch 120 and INP 150 connected to terminating switch 140, of course any number of additional terminal devices may be connected to originating switch 120 or terminating switch 140.

Database 170 contains customer records and can be embodied by a database server that receives database queries from originating switch 120. Database 170 can communicate with originating switch 120 by any of a number of protocols including the SS7 protocol.

In embodiments of the present invention, user device 110 and INP 150 communicate with each other via communication channel 190. Typically, communication channel 190 will include a voice channel (or a voice portion of the communication channel) and a data control channel (DCC). As is known, the voice channel carries audio signals while the data control channel carries signaling information between the user device 110 and INP 150. Typically, a DCC is a frequency pair used for the transmission or reception of cellular signaling information. After a cellular phone, for example, finds a DCC that is acceptable, it may lock on to that channel while waiting for cellular activity. For example, cellular activity may include placing an outgoing call, receiving an incoming call, receiving a message, etc. Tasks that may performed using the DCC may include, for example, locating a particular phone, processing a subscriber-originated call, transmitting data to and from a cell phone, or performing other system control functions.

Figure 2:
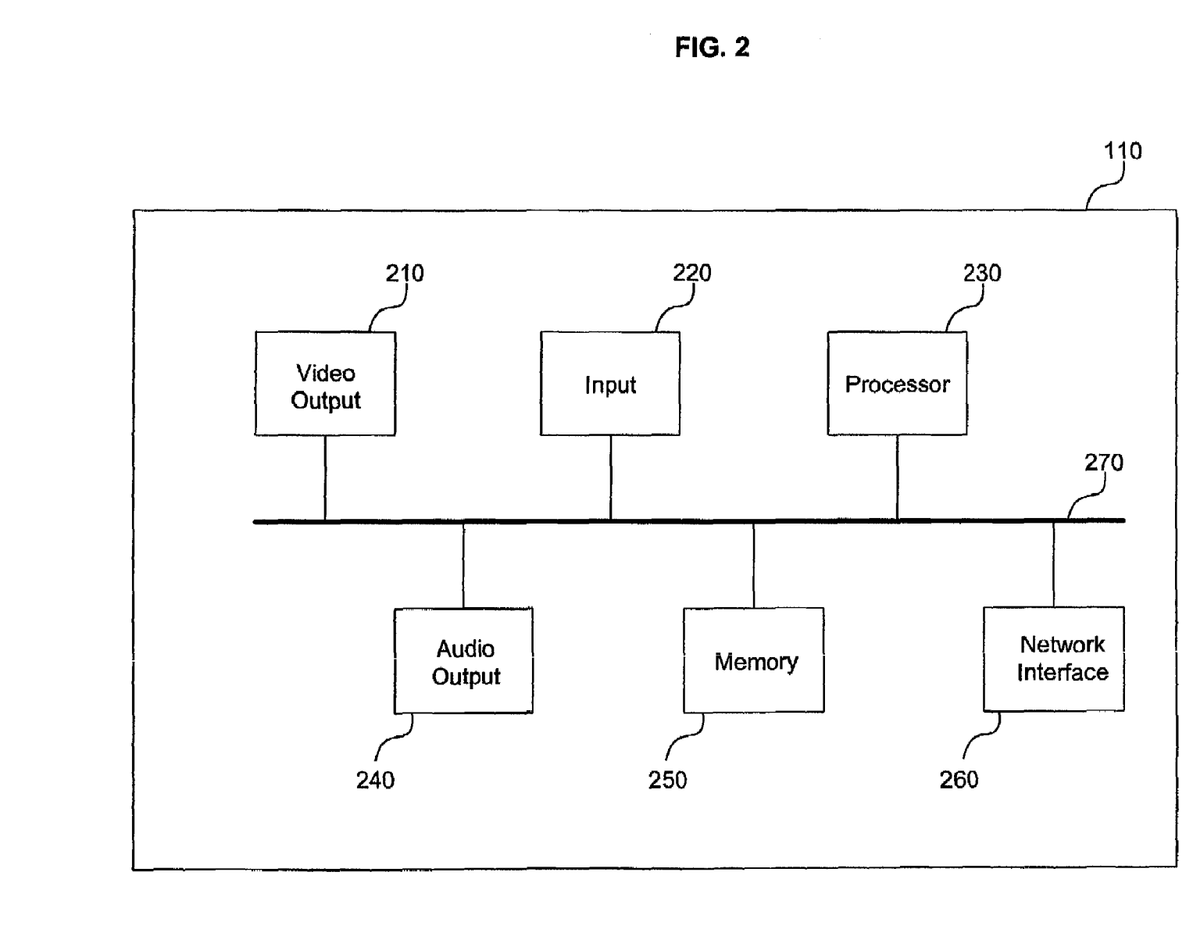
FIG. 2 is a block diagram of an information device in accordance with an embodiment of the present invention.

FIG. 2 is a block diagram of a typical terminal device 110. Terminal device 110 can include well-known components such as one or more network interfaces 260, one or more processors 230, one or more memories 250 containing instructions, one or more input devices 220, one or more audio output devices, and/or one or more video output devices such as displays 210. The components may transfer data from one another using bus 270. The terminal device may include additional components (not shown) that can be added to the device.

In one embodiment, network interface 260 can be wireless transmitter/receiver set in a mobile telephone that can communicate with an originating switch 120 such as a mobile switch. In another embodiment, the network interface in a wired telephone permits signals to be transmitted from the terminal device 110 to the originating switch 120 where the signals are routed through the transit network 130.

In one embodiment, processor 230 can be a general-purpose microprocessor, such as the Pentium® series microprocessor manufactured by the Intel Corporation of Santa Clara, Calif. In another embodiment, the processor can be an Application Specific Integrated Circuit (ASIC), which has been designed and/or can be configured to implement in its hardware and/or firmware at least a part of a method in accordance with an embodiment of the present invention.

In one embodiment, memory 250 can be coupled to a processor 230 via bus 270. Memory 250 can store instructions adapted to be executed by processor 230 according to one or more embodiments of the present invention. Memory 250 can be any device capable of storing analog or digital information, such as a hard disk, Random Access Memory (RAM), Read Only Memory (ROM), flash memory, a compact disk, a magnetic tape, a floppy disk, and any combination thereof.

In one embodiment, input device 220 can be a keyboard, keypad, touch-pad, pointing device, microphone, video camera, camera, scanner or a port(s) to attach other input devices. Audio output device 240 is typically a speaker for delivering audio signals. Video output device 210 can be a Liquid Crystal Display (LCD) or any other suitable type of display for displaying, for example, a text message.

Figure 3:
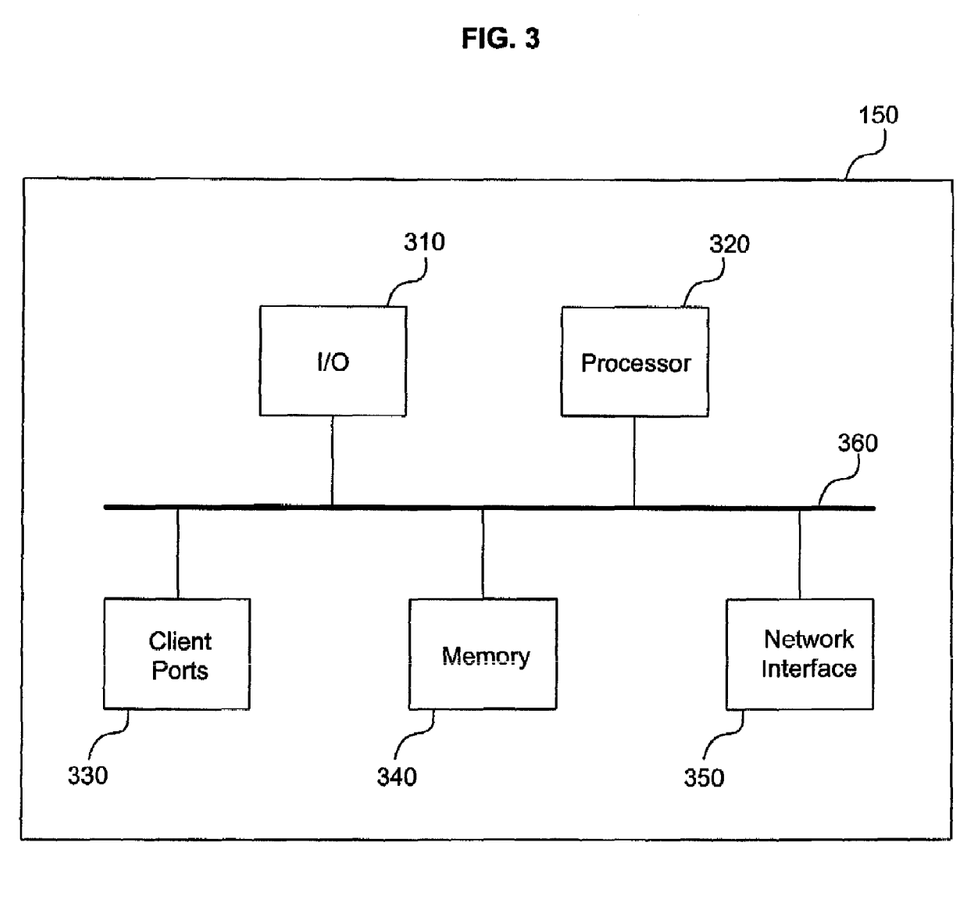
FIG. 3 is a block diagram of an intelligent network processor in accordance with an embodiment of the present invention.

FIG. 3 is a block diagram of INP 150 that contains intelligence to process data in accordance with embodiments of the present invention. INP 150 may be an intelligent PBX for processing data and instructions in accordance with embodiments of the present invention. INP 150 can include well-known components such as one or more network interfaces 350, one or more processors 320, one or more memories 340 containing instructions, one or more input/output ("I/O") devices 310 and one or more client ports 330. The components may be transfer data from one another using bus 360. The terminal device may include additional components (not shown) that can be added to the device.

In one embodiment, network interface 350 can be a traditional data modem, a fax modem, a cable modem, a digital subscriber line interface, ISDN interface, a broadband interface, a bridge interface, a hub interface, a router interface, or other type of interface. Network interface 350 may support a coaxial or twisted pair interface, optical interface, wireless interface or any other suitable interface to communicate with terminating switch 140. Network interface 350 can support T-1, T-3, ISDN Primary Rate Interface (PRI), ISDN Basic Rate Interface (BRI) or any other type of suitable communications channel.

In one embodiment, processor 320 can be a general-purpose microprocessor, such the Pentium series microprocessor manufactured by the Intel Corporation of Santa Clara, Calif. In another embodiment, the processor can be an Application Specific Integrated Circuit (ASIC), which has been designed to implement in its hardware and/or firmware at least a part of a method in accordance with an embodiment of the present invention.

In one embodiment, memory 340 can be coupled to a processor 320 and can store instructions adapted to be executed by processor 320 according to one or more embodiments of the present invention. Memory 340 can be any device capable of storing analog or digital information, such as a hard disk, Random Access Memory (RAM), Read Only Memory (ROM), flash memory, a compact disk, a magnetic tape, a floppy disk, and any combination thereof.

In one embodiment, instructions can be embodied in software, which can take any of numerous forms that are well known in the art. For example, system 100 can utilize one or more databases having a flat file or a relational organization, and a centralized or distributed architecture. For instance, those of skill in the art can tailor products such as a structured query language (SQL) database to provide the functionality of a method in embodiments of the invention. One supplier of such database products is Oracle Corporation, of Redwood Shores, Calif. Moreover, software standards and protocols such as EDI, FTP, HTTP, HTML, XML, cXML, XSL, SSL and WAP can be utilized for communications between terminal devices such as 110. Additionally, system 100 can utilize platform-independent and/or network-centric software tools such as, for example, CGI, Java, or JavaScript.

In one embodiment, I/O device 310 can be an audio and/or visual device, including, for example, a monitor, display, keyboard, keypad, touch-pad, pointing device, microphone, speaker, video camera, camera, scanner, and/or printer, including a port to which an I/O device can be attached or connected.

In one embodiment, INP 150 includes one or more client ports 330. Client ports 360 may be provided by communication cards (not shown) that can be plugged into slots available in INP 150. Client ports 350 provide a physical interface between external devices and INP. Client ports are used to plug-in and support client devices 160. Client devices may include, for, example desktop phones, PC based phone cards, processing services within the operating system of a PC, voice processing cards, active voice response systems, another INP, a PBX, a call processing system, or the like. Communication cards that may be plugged into INP 150 may include, for example, call processing cards, analog interface cards, voice processing cards, network interface cards, or the like.

Figure 4:
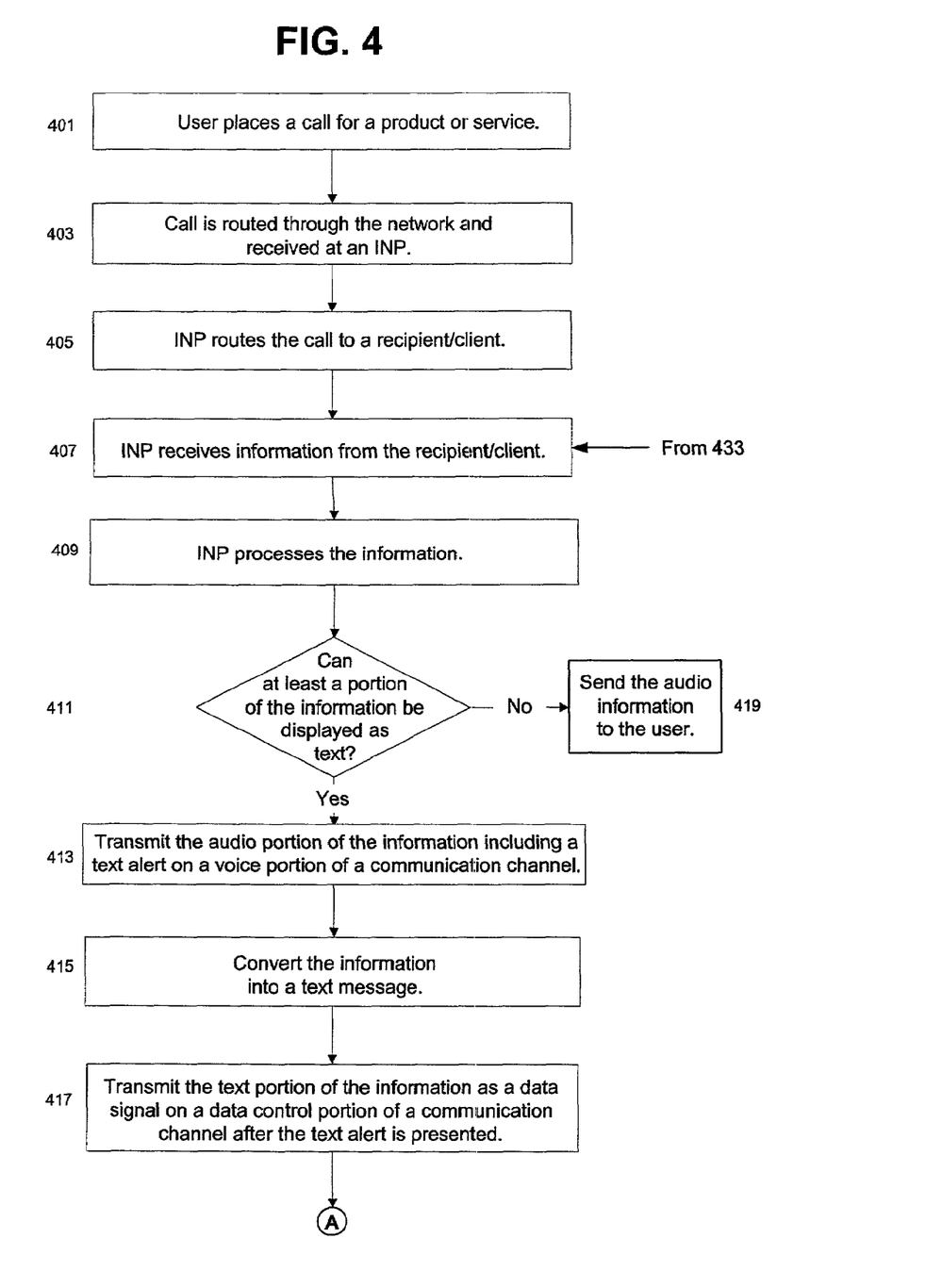
FIGS. 4 and 5 are flowcharts illustrating the manner in which calls are processed according to an embodiment of the present invention.
Figure 5:
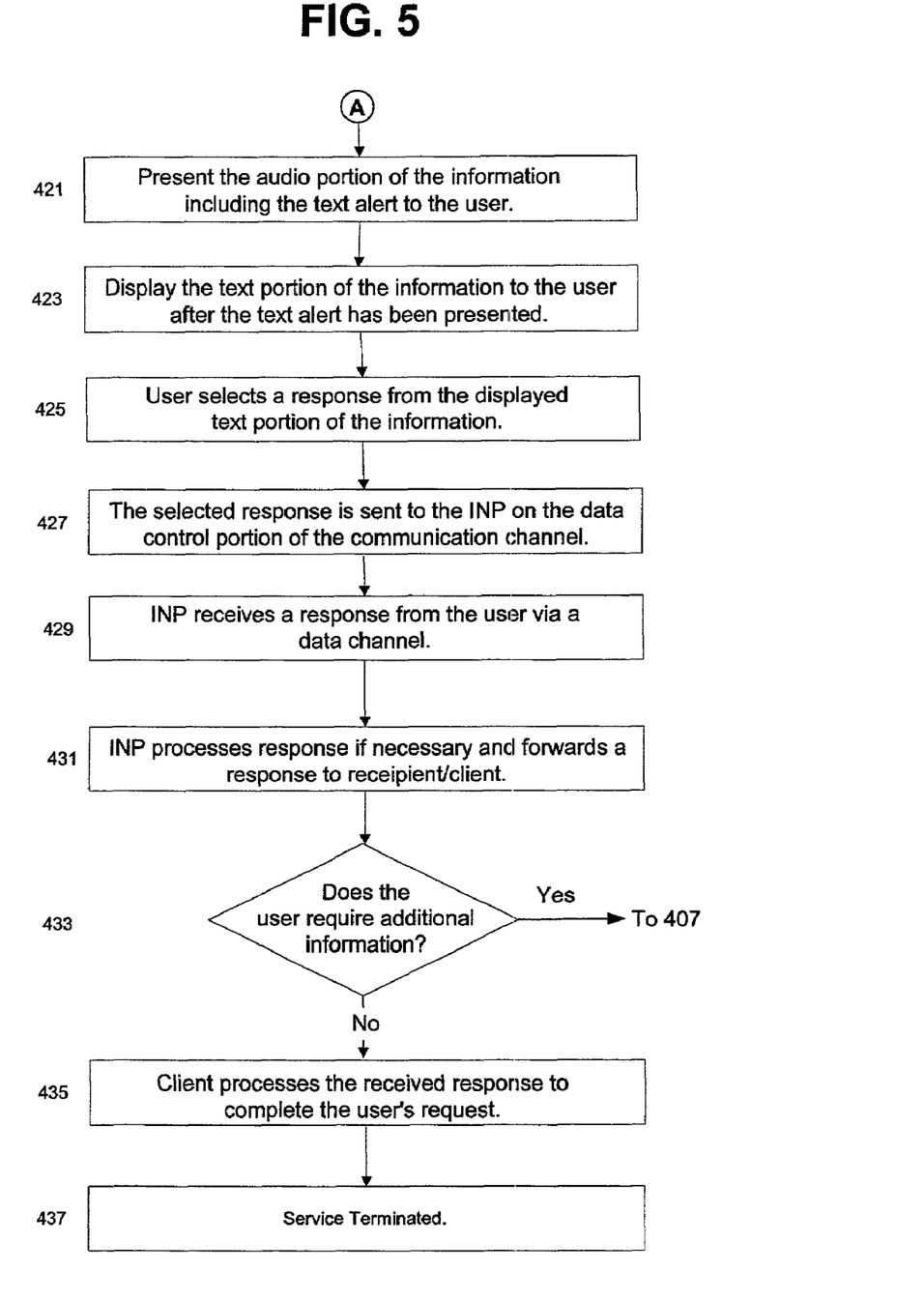

FIGS. 4 and 5 are flowcharts illustrating the manner in which calls are processed according to an embodiment of the present invention. A user places a call for a desired product or service using for example, user device 110 (401). For example, the user may call her bank to determine her savings account balance. The call is received at an originating switch, for example, originating switch 120 that routes the call through the translation network 130. Based on the dialed number, the call is received at, for example, terminating switch 140. Terminating switch 140 further routes the call to an INP, for example, INP 150 which in-turn forwards the call to a recipient or client device, for example, client device 160 (403–405).

In one embodiment, the client device is a VRU or an IVRU that is provided as an interface for delivering products and/or services. It is recognized that products can include all types of products available for sale, and services can include, for example, information services, maintenance services, financial services, service bureaus, cleaning services, management services, sports information, call management centers, banks, or any other suitable services. Client device 160 may be owned by the client providing the actual product and/or service or may be owned by a third party.

In this example, the bank's client device 160 is a PBX that provides a plurality of menus and sub-menus, related to the bank's services, for selection by its customers.

INP 150 receives information from the client device 160 (407). The information may be destined for the user device or alternatively, the information may trigger the INP to retrieve information from memory 340 that is destined for the user. After INP 150 receives or retrieves the information destined for the user, INP 150 processes the information (409). Information processing may include, for example, forwarding the information to the user device without further action, converting at least a portion of the audio information into a text message, retrieving other information from memory based on the received information, or performing other suitable processing step. For example, the INP may determine whether at least a portion of the information can be displayed as text (411).

Where the information does not contain a portion that can be displayed as a text message and/or a user does not have a device that can display the text information, then audio information as received from client device 160 is sent to the user (419). In alternative embodiments of the present invention, the user may select which portions of information should be displayed as text in accordance with embodiments of the present invention. For example, the user may elect to have all of the information received from the client device 160 converted as text and displayed on user device 110.

In this example, INP 150 may receive, from the bank's PBX 160, a suitable audio greeting and a list of choices for selection by the user. INP 150 may determine which information should be presented directly to the user and which information should be converted into text. In an embodiment of the present invention, client device 160 may provide a trigger or signal to INP 150 to indicate when information that is suitable for text conversion is being offered. Such triggers or signals may be provided at the beginning and end of the information that is suitable for conversion. In alternative embodiments, INP 150 may be programmed to look for trigger words or phrases that indicate when information suitable for conversion is being presented. Of course, other techniques can be used to determine when information that is suitable for text conversion is being presented to INP 150.

Once it is determined which information should be forwarded directly to user device 110 as an audio signal and which information should be converted into text before forwarding, INP 150 sends the audio information via the voice or audio portion of the communications channel and converts the other information into text (413). In this example, INP 150 may forward the audio greeting received from the bank's PBX 160 directly to user device 110 and converts the list of choices into text that can be displayed on user device 110.

In this example, the information transmitted from the bank's PBX 160 to INP 150 may be, for example, "Welcome to XYZ bank's automatic banking service. Please choose from the following choices: Press 1 to access your savings account; Press 2 to access your checking account; Press 3 to access your stock portfolio; Press 4 to transfer funds; or Press 5 to speak to an operator." INP 150 receives the audio information and separates or parses the audio information into an "audio portion" and a "text portion." INP 150 may consider the audio portion to be "Welcome to XYZ bank's automatic banking service." INP 150 transmits the audio portion of the information on the voice portion of the communication channel (415).

In an embodiment of the present invention, INP 150 may insert, after the audio portion of the information, a "text alert message" on the voice portion of the communication channel. The text alert may be any audio signal such as a "beep" or other signal or message that indicates the end of the current audio message and beginning of text display on user device 110. In embodiments of the present invention, the text alert may be a message such as "Please see display for list of choices and make a selection." Of course, other messages or signals can be used as text alerts to indicate to the user that text is being presented on user device 110.

INP 150 may consider the list of choice "Press 1 to access your savings account; Press 2 to access your checking account; Press 3 to access your stock portfolio; Press 4 to transfer funds; air Press 5 to speak to an operator" to be suitable for conversion into a text format. After this information is converted into text, INP 150 transmits the converted information on the DCC portion of the communication channel (417).

In an embodiment of the present invention, the transmitted voice and data signals are sent to the terminating switch 140 and routed to the originating switch 120 through transit network 130. The originating switch forwards the voice and data signals to user device 110.

As shown in FIG. 5, the audio portion of the information including the text alert is presented to the user via user device 110 (421). After the text alert is presented on user device 110, the text portion of the information is presented to the user (423).

In this example, the user may hear the audio message "Welcome to XYZ bank's automatic banking service. Please see display for list of choices and make a selection." The audio message includes, for example, a greeting and a text alert message. The device display may show the following information after the information has been transmitted to the user's device:

Welcome to XYZ Bank
Please Select:
Savings Account
Checking Account
Stock Portfolio
Transfer Funds
Operator After the user views the information, the user selects an appropriate response using, for example, the device keypad (425). In alternative embodiments, the user may make a selection by verbal inputs via the speaker on the user device 110. The selected response, for example, "Savings Account" is sent to INP 150 on the DCC of the communication channel (427). The signal representing the user's response is transmitted to the originating switch and routed through the access network 130 to the terminating switch 140. The terminating switch 140 forwards the response signal to INP 150.

Advantageously, in embodiments of the present invention, the user can scroll up and down and/or left and right to view all of the information that is being displayed. Additionally, if the user makes an error in selecting one of the choices, the user return to the display to make another selection.

INP 150 receives the response from the user via the data channel (429). The INP 150 may processes the response if necessary and forwards the response to the client's PBX 160 (431). For example, INP 150 may convert the received data signal representing the user's response into, for example, an audio message or another type of signal that can be recognized by the client 160. Once client 160 receives the response form INP 150, client 160 determines whether additional information needs to be transferred to the user (433). The additional information may be in the form of audio messages or text messages that are transmitted to the user. If additional information needs to be transferred to the user by client 160, client 160 may retrieve the additional information as necessary and the process may continue starting with step 407. This process may continue until the user no longer requires additional information from the client (433).

If, for example, after PBX 160 receives the user's reply indicating that "Savings Account" has been selected, from the list of options, then PBX 160 may send the message "Please enter Savings Account Number" to INP 150. INP 150 may convert this message into text and transfer it to the user device 110 via the DCC of the communication channel. The user's device display may show: "Enter Savings Account No.". Optionally or additionally, INP 150 may send the message on the voice portion of the communication channel and the user may receive the message "Please enter Savings Account Number" as a audio signal. In any event, The user may enter her savings account number using the device keypad or by verbal inputs, and the entered number is transmitted to INP 150 via the DCC of the communication channel.

For security purposes, it is recognized that before the savings account number or other information is transmitted on the DCC, such information may be encrypted in the user device 110 using any suitable known encryption techniques. In alternative embodiments of the present invention, for additional security, the user's savings account number, checking account number, or other information may be stored in internal memory 340 or external memory 180. This information may be retrieved automatically by the INP 150 and delivered to the PBX 160 if the user has been authenticated, or enters a password to authorize such delivery. Advantageously, in embodiments of the present invention, users do not have to enter such confidential information and risk the possibility that someone may capture such information during transmission.

After, for example, the user's savings account number has been authenticated, PBX 160 may forward additional menus or sub-menus to INP 150 for delivery to the user's display via the DCC of the communication channel. The user may return additional responses to INP 150 and PBX 160 via the DCC in the manner described above.

Once the user has made the final selection and reached their desired destination, PBX 160 processes the received response and the service according to the present invention can be terminated (437). In other words, if the user ultimately desired their savings account balance and, after navigating through the various menus and sub-menus, has made the appropriate selection, PBX 160 may in conjunction with another device such as a computer generate the users savings account balance and forwards this information to INP 150. INP 150 may send such information to user via the DCC as a text message for display and/or as an audio signal via the voice portion of the communication channel.

Figure 6:
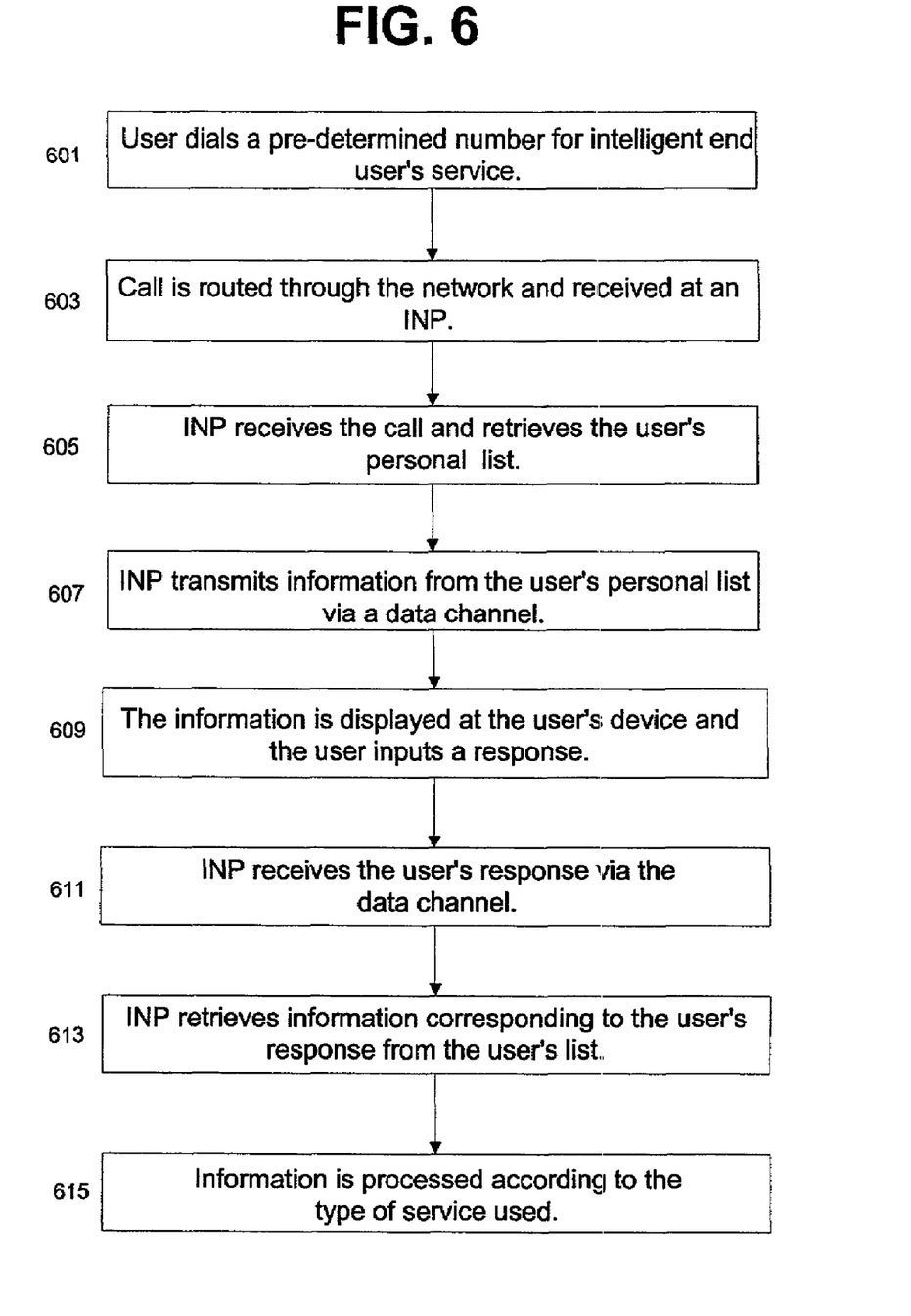
FIG. 6 is a flow chart illustrating the manner in which calls are processed according to an embodiment of the present invention.

FIG. 6 provides a flow chart illustrating the manner in which calls are processed according to an alternative embodiment of the present invention. A user dials a predetermined number for an intelligent end user's service (601). The intelligent service may be, for example, a paging service or voice mail service. The intelligent service may be, for example, an intelligent paging service, personal network directory service, and/or any other suitable service. The call is routed via the originating switch 120, access network 130 and terminating switch 140 and received at INP 150 (603). INP 150 receives the call and retrieves, for example, the user's personal list stored in either internal memory 340 and/or external memory 180 (605). The user's personal list may include a personal paging list that contains a list of names and corresponding paging numbers of individuals the user can page. In alternative embodiments of the present invention, the user may create a personal directory list that contains, for example, names and corresponding telephone numbers, mailing addresses, e-mail addresses, etc. of individuals as desired by the user. The user's personal directory list may be stored in either internal memory 340 and/or external memory 180. It is recognized that the user can create other types of personal lists that can be stored in either internal memory 340 and/or external memory 180, and the lists can be retrieved by INP 150 delivered to the user device 100 when required.

INP 150 may transmit information from the user's personal list to user device 110 via a data channel portion of the communication channel (607). The information from the personal list is displayed at user device 110 and the user inputs a response (609). For example, if the user subscribes to and accesses the intelligent paging service in step 601, then information from the user's personal paging list is retrieved and delivered to the user's device. This information may include, for example, a list of names of individuals that the user may frequently page. The user may search the list of names and select the name of the individual that the user would like to page.

In an alternative embodiment of the present invention, if the user subscribes to and accesses the intelligent personal network directory service in step 601, then information from the user's personal directory list is retrieved and delivered to the user's device. This information may include, for example, a list of names of individuals that the user may frequently call. The user may search the list of names and select the name of the individual that the user would like to call.

INP 150, via the data portion of the communication channel, receives the user's selection or response (611). Upon receiving the user's response, the INP retrieves information corresponding to the user's response from the user's personal list (613). The type information that is retrieved and the manner in which it is processed may depend on the type of services available in accordance with embodiments of the present invention (615). For example, if user accesses a paging service employing embodiments of the present invention, paging information is retrieved and processed as described below in more detail.

If paging information is retrieved, then INP 150 forwards the retrieved paging information to a client device 160, for example, a paging unit. The information may include, for example, the paging number of the party to be paged by the user and a return telephone number. The return telephone number could be automatically determined based on ANI (automatic number identification) information or CLID (calling line identification) information. In alternative embodiments of the present invention, the user may be presented with a list of call back numbers that may be previously stored in the user's personal database in memory 180. INP 150 may send the plurality of callback numbers to user device 110 over, for example, the data portion of the communication channel. The user may select the desired call back number from the list and the selection call back number is returned to INP 150 over the data portion of the communication channel. In any event, the return telephone number or the callback number is sent to the paging unit along with the paging number of the party being paged. The paging unit 160 pages the party based on the paging number and forwards the return telephone number or the call back number to the party's pager. Advantageously, the user can page individuals from their personal paging list stored in the network and delivered in accordance with embodiments of the present invention. The user does not have to remember or dial the paging number or their call back or return numbers.

Alternatively, for example, if the user accesses a personal directory service employing embodiments of the present invention, directory service information is retrieved and processed as described below in more detail.

If the user requests information from their personal network directory, the requested information is retrieved by INP 150 and returned to user device 110 on the data channel. For example, if the user requests information from the personal network directory, a list of names stored in the directory may be delivered to the user via the data channel and is displayed on user device 110.

In embodiments of the present invention, the user may select the name of an individual from their personal directory list to either call automatically or to retrieve additional information about. The user may be presented with, for example, a "call" selection and a "more information" selection. If the user selects the "call" selection, corresponding information is sent to INP 150 via the data channel. INP 150 retrieves information required to complete the call from the user's personal directory and completes the call. Alternatively, if the user selects the "more information" selection, INP 150 retrieves additional information from the user's personal directory and deliver the requested information to, for example, user device 110 via the data channel. The additional information may include, for example, telephone numbers, mailing addresses, e-mail addresses, etc. for the selected individual.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method for providing interactive text messages to a user's device during a voice call, the method comprising:
   receiving information from a client;
   determining based on content of the received information that at least a portion of the received information is suitable for conversion into a text format;
   converting the at least a portion of the received information into a text format;
   transmitting to the user's device non-converted information on a voice portion of a communications channel;
   transmitting to the user's device the converted information on a data control portion of the communications channel; and
   generating a text alert to indicate that text is being presented on the user's device.

2. The method of claim 1, further comprising:
   responsive to the transmitted converted information, receiving a user response on the data control portion of the communications channel.

3. The method of claim 2, further comprising:
   forwarding the received user response to the client.

4. The method of claim 2, further comprising:
   obtaining the user response from the data control portion of the communication channel; and
   converting the user response into an audio message.

5. The method of claim 4, further comprising:
   forwarding the audio message to the client.

6. The method of claim 1, further comprising:

receiving the non-converted information via voice portion of the communications channel; and receiving the converted information via the data control portion of the communications channel at the user's device.

7. The method of claim 1, further comprising:

presenting the non-converted information as audio information on the user's device.

8. The method of claim 1, further comprising:

appending the text alert to the non-converted information, wherein the text alert is transmitted on the voice portion of the communication channel.

9. The method of claim 8, further comprising:

transmitting to the user's device the converted information on the data control portion of the communications channel after the text alert is transmitted.

10. The method of claim 9, further comprising:

receiving a trigger identifying the information suitable for conversion.

11. The method of claim 9, further comprising:

responsive to the user response, retrieving stored information from memory; and forwarding the retrieved information to the client.

12. A method for providing interactive text messages to a user's device during a voice call, the method comprising:

receiving information from a client;

determining based on content of the received information that at least a portion of the received information is suitable for conversion into a text format;

based on the determining, separating the received information into a first portion that is suitable for text conversion and a second portion that is not suitable for text conversion;

converting the first portion into a text format;

transmitting to the user's device the second portion on a voice portion of a communications channel;

transmitting the converted portion on a data control portion of the communications channel; and generating a text alert to indicate that text is being presented on the user's device.

13. The method of claim 12 further comprising:

receiving a user response on the data control portion of the communications channel.

14. The method of claim 12 wherein the presented text includes a plurality of choices for selection by a user and the user response indicates at least a selected one of the plurality of choices.

15. The method of claim 13, further comprising:

forwarding the received user response to the client for processing.

16. A machine-readable medium having stored thereon a plurality of executable instructions, the plurality of instructions comprising instructions to:

receive information from a client;

determining based on content of the received information whether at least a portion of the received information is suitable for conversion into a text format;

based on the determining, separate the received information into a first portion that is suitable for text conversion and a second portion that is not suitable for text conversion;

convert the first portion into a text format;

transmit to the user's device the second portion on a voice portion of a communications channel;

transmit the converted portion on a data control portion of the communications channel; and generate a text alert to indicate that text is being presented on the user's device.

17. The machine-readable medium of claim 16, comprising further instructions to:

receive a user response on the data control portion of the communications channel.

18. The machine-readable medium of claim 17, comprising further instructions to:

transmit the text alert as audio on the voice portion of the communication channel, wherein the audio text alert indicates that text, based on the converted portion, is being presented on a user's device display.

19. The machine-readable medium of claim 18, comprising further instructions to:

forward the received user response to the client for processing.

20. Apparatus for providing interactive text messages to a users device during a voice call, the apparatus comprising:

a client input port configured to receive information from a client;

a processor configured to determine based on content of the received information whether at least a portion of the received information is suitable for conversion into a text format, and based on the determining, separate the received information into a first segment and a second segment, wherein the first segment is suitable for text conversion and a second segment is not suitable for text conversion, the processor is further configured to convert the first segment into a text format;

a transmitter configured to transmit the second segment on a voice portion of a communications channel and the transmitter is further configured to transmit the converted segment on a data control portion of the communications channel;

the transmitter further configured to transmit an audio text alert on the voice portion of the communication channel, wherein the audio text alert indicates that text, based on the converted portion, is being presented on a user's device display.

21. The apparatus of claim 20, further comprising:

a receiver configured to receive a user response on the data control portion of the communications channel.

22. The apparatus of claim 20, the client input port further configured to forward the received user response to the client for processing.

23. Apparatus for providing interactive text messages to a user's device during a voice call, the apparatus comprising:

a receiver means configured to receive information from a client;

a processor means configured to determine based on content of the received information whether at least a portion of the received information is suitable for conversion into a text format, and based on the determining, process the received information into a first segment and a second segment, wherein the first segment is suitable for text conversion and a second segment is not suitable for text conversion, and the processor means being further configured to convert the first segment into a text format;

a transmitter means configured to transmit the second segment on a voice portion of a communications channel and the transmitter means is further configured to transmit the converted segment on a data control portion of the communications channel;

wherein the transmitter means is further configured to transmit an audio text alert on the voice portion of the communication channel, wherein the audio text alert indicates that text, based on the converted portion, is being presented on a user's device display.

24. The apparatus of claim 23, wherein the receiver means further configured to receive a user response on the data control portion of the communications channel.

25. The apparatus of claim 23, wherein the transmitter means further configured to forward the received user response to the client for processing.

26. A method for providing an interactive, intelligent end users service, the method comprising:
responsive to a user call, retrieving a personal user list created by the user;
transmitting information from the personal user list via the data control portion of a communications channel to a user device;
receiving a user response via the data control portion of the communications channel;
retrieving additional information from the personal user list, the additional information corresponding to the received user response; and
forwarding the additional information to a client device for processing;
wherein the personal user list is a personal paging list, the personal paging list includes a plurality of names and corresponding paging numbers, and wherein the method further comprises
receiving a call back number; and
forwarding the call back number to the client device to complete a page based on the paging number and the call back number.

27. The method of claim 26, wherein the information transmitted to the user device includes at least one of the plurality of names.

28. The method of claim 27, wherein the received user response includes a selection of the at least one of a plurality of names.

29. The method of claim 28, wherein retrieved additional information includes the paging number from the personal paging list, the paging number corresponding to the selected name.

30. The method of claim 29, wherein the paging number is forwarded to the client device to complete a page.

31. The method of claim 26, wherein the call back number is received on the data control portion of the of the communication channel.

32. The method of claim 26 further comprising:
retrieving a plurality of call back numbers from the personal paging list; and
forwarding the plurality of call back number via the data control portion of the communication channel to the user device for selection.

33. The method of claim 32, further comprising:
receiving a selected one of the plurality of call back numbers via the data control portion of the of the communication channel; and
forwarding the selected call back number to complete the page based on the paging number and the call back number.

34. The method of claim 26, wherein the personal user list is a personal directory list, the personal directory list includes a plurality of names and at least one of a plurality of corresponding telephone numbers, e-mail addresses and mailing addresses.

35. The method of claim 24, wherein the information transmitted to the user device includes at least one of the plurality of names.

36. The method of claim 35, wherein the received user response includes a selection of the at least one of a plurality of names.

37. The method of claim 36, wherein retrieved additional information includes at least one of a plurality of corresponding telephone numbers, e-mail addresses and mailing addresses from the personal directory list.

38. The method of claim 37, wherein the telephone number corresponding to the selected one of a plurality of names is forwarded to the client device for call completion.

39. The method of claim 38, further comprising:
forwarding at least one of a plurality telephone numbers, e-mail addresses and mailing addresses corresponding to the selected one of a plurality of names to the user device via the data control portion of the communications channel.

40. A machine-readable medium having stored thereon a plurality of executable instructions, the plurality of instructions comprising instructions to:
responsive to a user call, retrieve a personal user list created by the user;
transmit information from the personal user list via the data control portion of a communications channel to a user device;
receive a user response via the data control portion of the communications channel;
retrieve additional information from the personal user list, the additional information corresponding to the received user response;
forward the additional information to a client device for processing;
wherein the personal user list is a personal paging list, the personal paging list includes a plurality of names and corresponding paging numbers, and wherein the instructions are further to
receive a call back number; and
forward the call back number to the client device to complete a page based on the paging number and the call back number.

41. The machine-readable medium of claim 40, comprising further instructions to:
retrieve a plurality of call back numbers from the personal paging list; and
forward the plurality of call back number via the data control portion of the of the communication channel to the user device for selection.

42. The machine-readable medium of claim 41, comprising further instructions to:
receive a selected one of the plurality of call back numbers via the data control portion of the of the communication channel; and
forward the selected call back number to the client device to complete the page based on the paging number and the call back number.

43. The machine-readable medium of claim 40, wherein the personal user list is a personal directory list, the personal directory list includes a plurality of names and at least one of a plurality of corresponding telephone numbers, e-mail addresses and mailing addresses.

44. The machine-readable medium of claim 43, comprising further instructions to:
forward at least one of a plurality telephone numbers, e-mail addresses and mailing addresses corresponding to a selected one of a plurality of names to the user device via the data control portion of the communications channel.

45. Apparatus for providing an interactive, intelligent end users s service, the apparatus comprising:
- a processor configured to retrieve a personal user list in response to a call, the personal user list created by a user;
- a transmitter configured to transmit information from the personal user list via the data control portion of a communications channel; and
- a receiver configured to receive a user response via the data control portion of the communications channel, the processor being further configured to retrieve additional information from the personal user list, the additional information corresponding to the received user response and the transmitter being further configured to forward the additional information to a client device for processing;
- wherein the personal user list is a personal paging list, the personal paging list includes a plurality of names and corresponding paging numbers, wherein the information transmitted to the user device includes at least one of the plurality of names, wherein the received user response includes a selection of the at least one of a plurality of names, wherein retrieved additional information includes the paging number from the personal paging list, the paging number corresponding to the selected name, and wherein the paging number is forwarded to the client device to complete a page; and
- wherein the receiver further configured to receive a call back number and the transmitter further configured to forward the call back number to the client device to complete a page based on a paging number and the call back number.

46. The apparatus of claim 45, wherein the processor is further configured to retrieve a plurality of call back numbers from a personal paging list and the transmitter is further configured to forward the plurality of call back numbers via the data control portion of the of the communication channel to the user device for selection.

47. The apparatus of claim 46, wherein the processor is further configured to retrieve a selected one of the plurality of call back numbers via the data control portion of the of the communication channel and the transmitter is further configured to forward the selected call back number to complete a page based on the paging number and the one selected call back number.

48. The apparatus of claim 45, wherein the personal user list is a personal directory list, the personal directory list includes a plurality of names and at least one of a plurality of corresponding telephone numbers, e-mail addresses and mailing addresses, wherein the information transmitted to the user device includes at least one of the plurality of names, wherein the received user response includes a selection of the at least one of a plurality of names, wherein retrieved additional information includes at least one of a plurality of corresponding telephone numbers, e-mail addresses and mailing addresses from the personal directory list, and wherein the telephone number corresponding to the selected one of a plurality of names is forwarded to the client device for call completion.

49. The apparatus of claim 45, wherein the transmitter further configured to forward at least one of a plurality telephone numbers, e-mail addresses and mailing addresses corresponding to a selected one of a plurality of names to the user device via the data control portion of the communications channel.

* * * * *